United States Patent [19]

Lühmann et al.

[11] Patent Number: 5,626,932
[45] Date of Patent: May 6, 1997

[54] ADHESIVE FILM STRIP

[75] Inventors: Bernd Lühmann, Norderstedt; Andreas Junghans, Hamburg, both of Germany

[73] Assignee: Beiersdorf Aktiengesellschaft, Hamburg, Germany

[21] Appl. No.: 515,886

[22] Filed: Aug. 16, 1995

[30] Foreign Application Priority Data

Sep. 8, 1994 [DE] Germany ............... 44 31 914.2

[51] Int. Cl.$^6$ ....................................... C09J 7/02
[52] U.S. Cl. .................. 428/40.1; 428/41.7; 428/41.8; 428/192; 428/201; 428/202; 428/212; 428/214; 428/323; 428/354; 428/356
[58] Field of Search .................... 428/40, 41, 42, 428/192, 194, 201, 202, 212, 214, 354, 356, 323; 206/411

[56] References Cited

U.S. PATENT DOCUMENTS 4,024,312  5/1977  Korpman ................. 428/343

FOREIGN PATENT DOCUMENTS

| 2642121 | 3/1978  | Germany . |
|---------|---------|-----------|
| 3331016 | 10/1984 | Germany . |
| 3714453 | 12/1988 | Germany . |
| 4222849 | 6/1993  | Germany . |
| 4233872 | 3/1994  | Germany . |
| 11333   | 7/1992  | WIPO .    |

*Primary Examiner*—Nasser Ahmad
*Attorney, Agent, or Firm*—Sprung Horn Kramer & Woods

[57] ABSTRACT

Strip of an adhesive film for a bond which can be redetached without residue, based on thermoplastic rubber and tackifying resins, the adhesive film possessing high elasticity and low plasticity and the adhesion being less than the cohesion, the adhesion disappearing when the film is extended, the ratio of pulling force to tearing load being at least 1:1.5, and an adhesive bond produced therewith being able to be separated by pulling on the adhesive film in the direction of the bonding plane, one end of the strip being provided on both sides with a covering which is adhesive on the side facing the adhesive film and which serves at the same time as a grip tab for pulling.

9 Claims, No Drawings

ADHESIVE FILM STRIP

BACKGROUND OF THE INVENTION

1. Field of the Invention

The invention relates to a strip of an adhesive film for a bond which is redetachable without leaving a residue.

2. Description of the Related Art

DE 33 31 016 C2 discloses adhesive films for redetachable (or temporary) adhesive bonds, which allow an adhesive bond produced therewith to be separated by pulling on the adhesive film in the direction of the bond plane. By means of adhesive films of this type, high adhesive forces and shear strengths can be achieved and adhesive bond systems can be separated again without further means, in comparable manner to the opening of a zip fastening or, better still, to the opening of a preserving jar: the rubber seal is pulled out of the sealing join via the grip tab. In practice, however, considerable disadvantages have become evident with the use of such adhesive films. Firstly, the product requires explanation. Any person not having previously used such an adhesive film is quite liable to bond the parts, which are to be joined, to one another in such a way that the adhesive film disappears between the joined parts, no longer protrudes and is therefore no longer able to be pulled on: the result is an irreversible bond with the attendant disappointment. The disappointment, however, is just as great if the adhesive film is used correctly but then, when pulled, tears: here too, an irreversible bond is the result. The advantage of an adhesive bond which can be redetached without damaging the joined parts in a very simple manner just by pulling is transmuted into a drastic disadvantage, since precisely those joined parts which were to be separated again are now permanently bonded. Often the only solution is to destroy the joined parts. The problem of tearing on pulling was recognized by the inventors of DE 33 31 016 C2, who paid particular attention to it. Accordingly, in the middle of page 4, a specific ratio of pulling force to tearing load is indicated: the tearing load should always be greater than the pulling force and for reliability the ratio of pulling force to tearing load should be from 1:2 to 1:3.

In practice, however, it has been found that this precautionary measure is in many cases inadequate. A bond of substrates on an open-air exhibition site, which is to be separated again after the end of the exhibition, can no longer be separated owing to tearing. The same is true, for instance, of calendars or advent decorations stuck to a window. Posters or pictures, too, fastened in this way to a wall, irreversibly become part of the decoration of the wall as soon as the adhesive films tear on pulling. The damage is considerable, the customer lost. Moreover, the use of even thicker adhesive films, as recommended in DE 33 61 016 C2, is unable to prevent such tearing. In addition, DE 37 14 453 C1 discloses the use of such an adhesive film, referred to therein as a strip tape, to enable the non-destructive removal of practice explosive charges from practice objects. Here too, a tab 6 is left projecting laterally from the adhesive join so that this tab can be pulled and the bond system separated again in this way. In this application, as well, tearing occurs in practice.

This problem of tearing is recognized by DE 42 22 849 C1, which proposes the application, on that end of the adhesive film which is pulled, of a UV-impermeable cover as grip tab. The intention thereby is to avoid from the outset damage to the adhesive film initiated by UV rays; it is from sites of such damage that a tear can be formed on pulling and can propagate. Nevertheless, even with these adhesive films tearing occurs. Similarly, DE 42 33 872 C2 describes a redetachable self-adhesive hook which has a UV-impermeable grip tab on the adhesive film. Here too, tearing occurs.

WO 92/11333 describes adhesive films for corresponding applications, which films comprise a backing film which combines low elasticity with high elongation. In such products, the tear-resistant backing film means that the problem of tearing does not occur, in contrast to the above-described products which consist purely of adhesive composition without a backing film.

The object of the invention was to remedy this situation. This is because the problem of tearing constitutes a central problem for adhesive films which purely comprise adhesive composition and do not have a backing film.

This object is achieved by adhesive film strips as characterized in more detail in the patent claims.

The fundamental construction of the adhesive strips according to the invention, and application-related dimensions, are described in detail in DE 42 22 849 C1, DE 33 31 016 C2 and DE 42 33 872 C2 for adhesive compositions and cover papers/cover films and can be employed equally for the present adhesive film sections according to the invention.

SUMMARY OF THE INVENTION

The adhesive film sections according to the invention are, in particular, rendered non-adhesive by using lamination to apply grip-tab strips in the grip region. Suitable grip-tab strips in this context are primarily those based on thin sheets (plastics films, metal foils) and paper, which either have per se a sufficiently low adhesion to the adhesive composition employed or, usually, are rendered adhesive with respect to the corresponding adhesive composition by coating with an appropriate release coating. Suitable in principle are not only films and papers but also two-dimensional structures with an adhesive effect which are based, for example, on nonwoven materials (polymer webs, paper webs) and fabrics, to name but a few. Sufficiently low release forces with respect to the adhesive compositions used are essential for successful use. The aim is for release forces of less than 3N/cm, in particular less than 0.3N/cm. In the case of very low release force values in particular, a reduction is obtained simultaneously in the coefficients of static friction and of sliding friction of the films treated in this way with respect to human skin, with the result that a secure grasp of the grip tabs in the course of detachment is not ensured in every case. Consequently, it is advantageous to employ one-sided release-coated grip-tab strips, with the adhesive side facing the adhesive and the non-adhesive side facing that side which faces away from the adhesive.

DESCRIPTION OF PREFERRED EMBODIMENTS

The thicknesses of the grip-tab strips are usually selected in such a way that, even when these strips reach into the adhesive join, a maximum degree of bonding (in terms of area) of the tacky regions, and therefore a maximum bonding strength, is ensured. Particularly suitable grip-tab strips are those which correspond in their thickness to not more than 20% of the overall thickness of the adhesive composition which covers them, but ideally those which in their thickness correspond to not more than 10% of the overall thickness of the adhesive composition which covers them.

To formulate the desired release forces of the grip-tab strips to the sides facing the adhesive, they can be coated in conventional manner with materials having an adhesive action. Suitable release forces are brought about, inter alia, by polymers comprising long aliphatic side chains, for example reaction products of polyvinyl alcohol with stearyl isocyanate (poly(vinyl stearylcarbamate)), reaction products of polyethyleneimine with stearyl isocyanate, or Cr complexes of long-chain carboxylic acids (Quilon C from Costenoble), to name but a few. Of prime suitability are silicones with an adhesive effect, especially those based on crosslinked polymethylsiloxanes and crosslinked polydimethylsiloxanes, since these compounds, especially in the form of a blend, enable the formulation of a wide range of release forces and, in particular, of very low release force values of markedly below 1N/cm with respect to the pressure-sensitive adhesive compositions employed. Compositions which can be used in this context in accordance with the invention include addition-curing systems, condensation-curing systems and materials which crosslink by irradiation with high-speed electrons or UV rays.

Test methods

The suitability of appropriate grip-tab strips can be determined by means of comparative practical bonds as described below. It has been shown that the results of the "tear test" described below correlate with the results of corresponding practical bonds.

Test for strippability (practical bonds):

Testing is carried out on pieces of adhesive film measuring 50 mm*20 mm*and 700 μm (length*width*thickness) which carry at one end on both sides a grip tab measuring 15 mm*20 mm. The pieces of adhesive film are stored for 24 h under normal climatic conditions (T=+23° C., 50% relative humidity) and are then subjected to bonding such that, in a first working step, the adhesive strip is bonded over the entire area to a steel plate (by rolling over it twice with a 2 kg steel roller), then the other side of the piece of adhesive film is bonded to another steel plate in such a way (pressed on for 5 seconds with a pressure of 100N) that the grip-tab films reach about 1–2 mm into the adhesive join. Samples are stored in a convection oven at +40° C. for 24 h, then conditioned for 2 h under normal climatic conditions.

The parameter assessed is the number of pieces of adhesive film which tear when the bond is separated. In order to separate the bond, the adhesive strips are stripped off by hand, from the adhesive join, using the grip tab, parallel to the bond plane in the lengthwise direction of the adhesive strips. The separation rate in the test is about 250 mm/sec.

Tearing test at high separation rate:

Testing is carried out on pieces of adhesive film measuring 50 mm*20 mm*700 μm (length*width*height) which carry at both ends and on both sides a grip tab measuring 15 mm*20 mm. In the regions of the grip tabs, pieces of adhesive film are held firmly with both hands between thumb and index finger and pulled apart so quickly that tearing occurs. It is possible to investigate grip tabs of the same construction and, in direct comparison, those of different construction.

The parameter assessed is the position of the fracture site, which may be situated in one of the grip-tab regions or in the central region devoid of grip tabs.

EXAMPLES

The invention is described below with reference to practical examples, without wishing to restrict it unnecessarily thereby. All parts are by weight.

Example 1

An adhesive composition consisting of 100 parts of SIS rubber (Vector 4211; from Dexco), 100 parts of a pentaerythritol ester of partially hydrogenated resin (Foralyn 110 from Hercules) and 1 part of phenolic antioxidant (Irganox 1010 from Ciba) is coated, using a single-screw extruder fitted with a slot die, at +130° C. in a thickness of 700 μm on to a polyethylene terephthalate film (PETP: Hostaphan RN 25) which is itself coated on both sides with a silicone release coating. The stock bale obtained is then processed further to give 60 mm wide subsidiary rolls. The tear strength of the adhesive composition is determined in accordance with DIN 53504 and found to be greater than 7 MPa.

For a comparative practical test, strips measuring 60 mm*20 mm are punched out from the subsidiary rolls, and are laminated at one end on both sides over the entire width with the grip-tab strips measuring 15 mm*20 mm listed in the table below:

| No. | Type of grip-tab strip | Release coating | Backing thickness | Amount of release coating applied |
|---|---|---|---|---|
| 1] | PETP film | none | 12 μm | none |
| 2] | PETP film | silicone release coating A | 12 μm | 0.2 ± 0.05 g/m² |
| 3] | PETP film | silicone release coating A | 25 μm | 0.2 ± 0.05 g/m² |
| 4] | PETP film | silicone release coating B | 25 μm | 0.25 ± 0.05 g/m² |
| 5] | PETP film | silicone release coating C | 25 μm | 0.2 ± 0.05 g/m² |
| 6] | BOPP film | silicone release coating A | 28 μm | 0.2 ± 0.05 g/m² |
| 7] | CAC film | PVSC | 36 μm | 0.25 ± 0.05 g/m² |
| 8] | PE film | silicone release coating | 100 μm | 0.7 ± 0.01 g/m² |

Key
PETP film 12 μm = Hostaphan RN 12 (from Hoechst)
PETP film 25 μm = Hostaphan RN 25 (from Hoechst)
PP film = Bicor 28 MB 250 (from Mobil Plastics)
CAC film = Clarifoil P20 (from Courtaulds, release coating on matt side of film)
PE film = Q 16000 (from Forchheim)
Silicone release coating A = 95.4 parts of Syloff 7144 coating + 2.3 parts of Syl-off Q2-7131 + 2.3 parts of Dow Corning 176 catalyst (all from Dow Corning)
Silicone release coating B = addition-curing silicone
Silicone release coating C = addition-curing silicone
Silicone release coating D = electron beam-crosslinked silicone: 70 parts of RC 711 + 70 parts of RC 726 (both from Goldschmidt);
EB dose = 30 kGy
PVSC = poly(vinyl stearylcarbamate): average molecular mass: about 90,000 g/mol Softening point: 92–107° C. (Mettler FP-800)

For the materials listed in the above table, the release forces with respect to the abovementioned adhesive composition were determined, and the number of tears was determined comparatively in the practical bonding test likewise mentioned above. The results obtained are listed below:

| No. | Release force | % tears (practical test) |
|---|---|---|
| 1] | >10 N/cm | 80 |
| 2] | 0.04 ± 0.01 N/cm | 0 |
| 3] | 0.04 ± 0.01 N/cm | 0 |
| 4] | 0.085 ± 0.015 N/cm | |
| 5] | 0.14 ± 0.02 N/cm | 10 |
| 6] | 0.04 ± 0.01 N/cm | 0 |
| 7] | 2.0 ± 1.0 N/cm | 30 |
| 8] | 0.04 ± 0.01 N/cm | 0 |
| 9] | . . . N/cm | . . . |

By using the release-coated films, a drastic reduction in the tearing tendency is achieved.

Example 2

In accordance with the tearing test described above, the following pieces of adhesive film were investigated:

| No. | Grip tab A | Grip tab B | Grip tab A | Central region | Grip tab B |
|---|---|---|---|---|---|
| | | | \multicolumn{3}{c}{Number of tears} | | |
| 1 | 25 μm PETP no release coating | 25 μm PETP no release coating | 5 | 0 | 5 |
| 2 | 25 μm PETP no release coating | 12 μm PETP no release coating | 5 | 0 | 5 |
| 3 | 25 μm PETP no release coating | 25 μm BOPP no release coating | 5 | 0 | 5 |
| 4 | 25 μm PETP no release coating | 25 μm PETP silicone coating C | 9 | 0 | 1 |
| 5 | 25 μm PETP no release coating | 25 μm PETP silicone coating B | 10 | 0 | 0 |
| 6 | 25 μm PETP no release coating | 25 μm PETP no silicone coating A | 10 | 0 | 0 |
| 7 | 25 μm PETP silicone coating C | 25 μm PETP silicone coating C | 5 | 0 | 5 |
| 8 | 25 μm PETP silicone coating C | 25 μm PETP silicone coating A | 10 | 0 | 0 |
| 9 | 25 μm PETP silicone coating A | 25 μm PETP silicone coating A | 2 | 2 | 2 |
| 10 | 36 μm CAC PVCS | 25 μm PETP no release coating | 2 | 0 | 8 |
| 11 | 36 μm CAC PVCS | 25 μm PETP silicone coating A | 10 | 0 | 0 |

Key:
Key as for Example 1.

Grip-tab strips without a release coating show the same tendency of tearing in the grip-tab region when subjected to rapid stretching. As the degree of adhesion of the grip-tab strips with respect to the adhesive composition increases, there is a strong reduction in the tendency to tear in the region of the grip tab which has been rendered adhesive. At very low release forces, tears are likewise observed in the central region between the two grip tabs.

Example 3

An adhesive composition consisting of 50 parts of SIS rubber (Vector 4211 from Dexco), 50 parts of SBS rubber (Vector 4261 from Dexco), 100 parts of a pentaerythritol ester of balsam resin (Permalyn 6110 from Hercules), 0.5 part of phenolic antioxidant (Irganox 1076 from Ciba) and 0.25 part of TNPP (Lownox TNPP from Lowi) is processed as in Example 1 to give a strip of adhesive film 700 μm thick and measuring 60 mm * 20 mm which is laminated at one end on both sides over its entire width with the grip-tab films or grip-tab papers, measuring 15 mm * 20 mm, listed in the table below:

| No. | Type of grip-tab strip | Backing thickness |
|---|---|---|
| 1] | PETP film without release coating | 12 μm |
| 2] | Release paper A | 70 μm |
| 3] | Release paper B | 65 μm |
| 4] | Release paper C | 65 μm |

Key:
PETP film 12 μm = Hostaphan RN 12 (from Hoechst)
Release paper A = KS 90052 B/52B20 (from Laufenberg)
Release paper B = HV 80-622/368 more lightly release-coated side (from 4P-Rube)
Release paper C = HV 80-622/368 more heavily release-coated side (from 4P-Rube)

For the materials listed in the above table, the release forces with respect to the abovementioned adhesive composition were determined and the number of tears were determined comparatively, likewise in the abovementioned practical bonding test. The results obtained are listed below:

| No. | Release force | % tears (practical test) |
|---|---|---|
| 1] | >10 N/cm | 80 |
| 2] | 0.5 ± 0.1 N/cm | 10 |
| 3] | 0.3 ± 0.1 N/cm | 0 |
| 4] | 0.1 ± 0.03 N/cm | 0 |

By using the release-coated papers, in accordance with Example 1 a drastic reduction in the tearing tendency is achieved.

We claim:

1. Strip of an adhesive film for a bond which can be redetached without residue, based on thermoplastic rubber and tackifying resins, the adhesive film possessing high elasticity and low plasticity and the adhesion being less than the cohesion, the adhesion disappearing when the film is extended, the ratio of pulling force to tearing load being at least 1:1.5, and an adhesive bond produced therewith being able to be separated by pulling on the adhesive film in the direction of the bonding plane, one end of the strip being provided on both sides with a covering which is adhesive on the side facing the adhesive film and which serves at the same time as a grip tab for pulling, the release force of the covering film being less than 3N/cm.

2. Strip according to claim 1, the covering being a release-coated film or a release-coated paper.

3. Strip according to claim 1, the covering being UV-impermeable.

4. Strip according to claim 1, in which the composition is formulated to be self-adhesive.

5. Strip according to claim 1, the composition comprising antioxidants, UV stabilizers, colorants, fillers and conventional auxiliaries.

6. Strip according to claim 1, having a thickness from 0.2 mm to 1.2 mm.

7. Strip according to claim 1, the ratio of pulling force to tearing load being from 1:1.5 to 1:5.

8. Strip according to claim 1, wherein the thermoplastic rubber and tackifying resins are hot kneaded and extended to form the adhesive portion of said film.

9. In combination, a substrate, an article, and an adhesive film according to claim 1 bonding the article to said substrate so that it can be redetachably bonded to the substrate without leaving a residue, the grip tab of the film being optically covered by a removable cover.

* * * * *

UNITED STATES PATENT AND TRADEMARK OFFICE
CERTIFICATE OF CORRECTION

PATENT NO. : 5,626,932
DATED : May 6, 1997
INVENTOR(S) : Luhmann, et al.

It is certified that error appears in the above-indentified patent and that said Letters Patent is hereby corrected as shown below:

Col. 6, claim 5 line 1  After " comprising " insert -- at least one of --

Signed and Sealed this

Twelfth Day of May, 1998

*Attest:*

*Attesting Officer*

BRUCE LEHMAN

*Commissioner of Patents and Trademarks*